United States Patent
He et al.

(10) Patent No.: US 12,297,324 B2
(45) Date of Patent: May 13, 2025

(54) EIGHT-ARM STAR-SHAPED THERMOPLASTIC ELASTOMER COPOLYMER AND PREPARATION METHOD THEREFOR

(71) Applicant: SOOCHOW UNIVERSITY, Suzhou (CN)

(72) Inventors: Jinlin He, Suzhou (CN); Bin Wang, Suzhou (CN); Peihong Ni, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 540 days.

(21) Appl. No.: 17/774,833

(22) PCT Filed: Nov. 5, 2020

(86) PCT No.: PCT/CN2020/126878
§ 371 (c)(1),
(2) Date: May 5, 2022

(87) PCT Pub. No.: WO2021/088942
PCT Pub. Date: May 14, 2021

(65) Prior Publication Data
US 2023/0025095 A1 Jan. 26, 2023

(30) Foreign Application Priority Data
Nov. 5, 2019 (CN) .......................... 201911072733.5

(51) Int. Cl.
| C08G 77/442 | (2006.01) |
| C08F 283/12 | (2006.01) |
| C08F 290/14 | (2006.01) |
| C08L 83/10 | (2006.01) |

(52) U.S. Cl.
CPC .......... *C08G 77/442* (2013.01); *C08F 283/12* (2013.01); *C08F 290/148* (2013.01); *C08L 83/10* (2013.01); *C08L 2207/04* (2013.01)

(58) Field of Classification Search
CPC ... C08G 77/442; C08F 283/12; C08F 290/148
See application file for complete search history.

(56) References Cited

FOREIGN PATENT DOCUMENTS

| CN | 102633953 A | 8/2012 |
| CN | 106633087 A | 5/2017 |
| CN | 110003481 A | 7/2019 |
| KR | 20140135907 A | 11/2014 |

OTHER PUBLICATIONS

Machine translation of Chapter 7 of (China Doctoral Dissertation Full-text Database, Engineering Technology I), Sep. 15, 2012 (Sep. 15, 2012), No. 09, pp. BO14-59, ISSN 1674-022X.*

"Towards New Hybrid Star-Shaped or Crosslinked Materials based on Macromonomers and Silsesquioxanes" authored by Harris et al. and published in Polymer Preprints (2008) 49(1), 129-130.*

He Jinjin, Study on Functional Polymers Prepared by Ring-opening Polymerization and/or Living Anionic Polymerization, Science-Engineerings (A), China Doctoral Dissertations Full-text Database, No. 09, Sep. 15, 2012.

* cited by examiner

*Primary Examiner* — Marc S Zimmer
(74) *Attorney, Agent, or Firm* — SZDC Law PC

(57) ABSTRACT

An eight-arm star-shaped thermoplastic elastomer copolymer and a preparation method therefor; a polystyrene-polyisoprene lithium compound and a polystyrene/diphenylethylene-polyisoprene lithium compound are synthesized by using active anionic polymerization, and the compounds are used for a coupling reaction with octenyl polyhedral oligomeric silasesquioxane to obtain the copolymer. The method has the characteristics of convenient operation, high reaction efficiency, mild reaction conditions, and few side reactions. The structure and molecular weight of the prepared eight-arm star-shaped polymer are controllable, and the molecular weight distribution is narrow. A polymer segment obtained by the copolymerization of diphenylethylene (DPE) and styrene (St) is used as a hard segment, which enables the eight-arm star-shaped thermoplastic elastomer copolymer to have more outstanding mechanical properties. At the same time, a polymer segment composed of DPE and St units has a higher glass transition temperature than polystyrene, which increases the upper limit usage temperature of the eight-arm star-shaped copolymer.

6 Claims, 9 Drawing Sheets

EIGHT-ARM STAR-SHAPED THERMOPLASTIC ELASTOMER COPOLYMER AND PREPARATION METHOD THEREFOR

This application is the National Stage Application of PCT/CN2020/126878, filed on Nov. 5, 2020, which claims priority to Chinese Patent Application No. 201911072733.5, filed on Nov. 5, 2019, which is incorporated by reference for all purposes as if fully set forth herein.

TECHNICAL FIELD

The invention relates to the field of polymer synthesis, in particular to eight-arm star-shaped thermoplastic elastomer copolymer and its preparation method therefore.

BACKGROUND TECHNIQUE

Thermoplastic Elastomer, TPE, is a type of polymer material with physical properties between plastic and rubber. They show rubber elasticity at room temperature, can be plasticized and molded at high temperature, have mechanical properties and use properties similar to rubber, and can be processed and recycled as thermoplastics, so they are known as the "third-generation rubber." Since they do not require thermal vulcanization similar to rubber, they are relatively simple to process and shape, and the final product can be easily made by ordinary plastic processing machinery. Moreover, there is no obvious loss in performance of the product produced by reprocessing after TPE recycling. This has obvious advantages over traditional rubber, which can be regarded as a revolution in materials and technology in the rubber industry. TPEs that have been industrially produced include polystyrenes, polyolefins, polyurethanes, polyesters, polyvinyl chlorides, polyamides, organic fluoropolymers, silicone polymers, etc., which almost cover the current synthesis All areas of rubber and synthetic resins.

Star polymer is generally defined as a polymer with three or more polymer segments radiating from the core. It is mainly divided into regular star-branched polymers with the same block and asymmetrical different blocks. The heteroarm star-branched polymer. The linear branches that make up the star polymer are called the "arms" of the star polymer, and the multifunctional group in the center is called the "core" of the star polymer. However, it is still challenging to synthesize star polymers with a clear structure, controllable molecular weight and narrow molecular weight distribution. At present, there are four main methods for synthesizing star polymers: coupling method, pre-nucleation method, The first arm method and the iterative method that appeared later. The basic idea of the first three synthetic routes is to realize the synthesis of star polymers by using multifunctional initiators or coupling agents and bifunctional monomers. The "coupling method" is to use the functionalized linear branch of the terminal group and the multifunctional core to carry out the coupling reaction to obtain the star polymer. This method is generally not efficient; the "pre-nucleus method" mainly uses the multifunctional initiator The monomer polymerization is initiated to obtain a star polymer with relatively consistent arm lengths. However, this method takes a long time, and with the increase of molecular weight, the volume steric effect becomes larger, and the reaction is difficult to complete; the "first arm method" is the first method. Synthesize linear polymer chains with special end groups or active ends, and then use multifunctional molecules that can react with special end groups or active ends to produce star polymers. This method can easily control star arms. The molecular weight and molecular weight distribution of the resulting star polymers with more uniform arm lengths are obtained. However, this method takes a long time to polymerize into star polymers, and sometimes the reaction is difficult to complete. The iterative rule requires the addition of a variety of more complex reagents and requires multi-step reactions, and as the number of arms of the star polymer increases, the reaction time becomes longer and longer. Therefore, it is still a major challenge in the field of polymer synthesis to be able to quickly, efficiently and conveniently prepare a star polymer with a regular structure and a clear composition, and to accurately control its molecular weight and molecular weight distribution. This also requires the development of new synthetic methods. For the synthesis of star-shaped thermoplastic elastomer TPE copolymers.

Technical Problem

The object of the present invention is to provide an eight-arm star-shaped thermoplastic elastomer copolymer and its preparation method therefore. The living anionic polymerization method is used to prepare polystyrene-polyisoprene lithium compounds and polystyrene/diphenylethylene-polyisoprene lithium compounds with precise structure and narrow molecular weight distribution, and use them to align with octavinyl polyhedrons. The polysilsesquioxane undergoes a coupling reaction, and the eight-arm star-shaped thermoplastic elastomer copolymer can be prepared quickly and conveniently. The method disclosed in the present invention has high reaction efficiency, mild reaction conditions, few side reactions, and a high molecular weight. The characteristics of good molecular weight distribution control.

Technical Solutions

In order to achieve the above-mentioned object of the invention, the technical solution adopted by the present invention is: an eight-arm star-shaped thermoplastic elastomer copolymer, with the structure shown as follow,

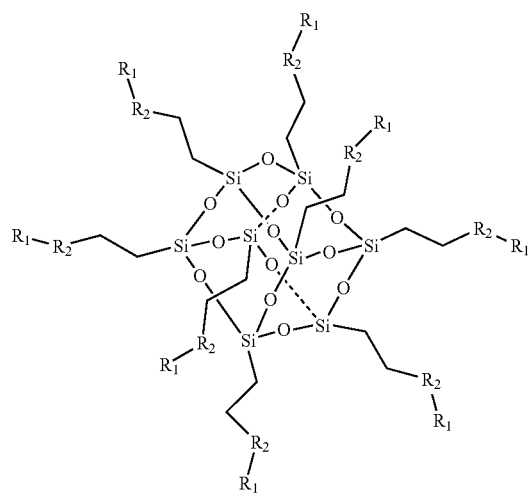

Wherein, the hard blocks $R_1$ is

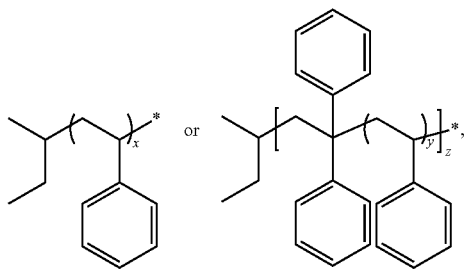

the soft blocks $R_2$ with x is from 10 to 200, y is from 2 to 10, z is from 5 to 20, m is from 200 to 600, n is from 10 to 30, the value types of "x", "y", "z", "m", "n" are all integers, and * represents the connection site.

The present invention provides a method for preparing the above-mentioned eight-arm star-shaped thermoplastic elastomer copolymer, includes the following steps:

(1) Under nitrogen protection, the lithium compound initiates styrene polymerization to obtain a poly(styryl) lithium(PS—Li).

(2) Under nitrogen protection, the poly(styryl)lithium (PS—Li) in step (1) initiates diolefin polymerization to obtain a polystyrene-polydiolefin lithium compound.

(3) Under nitrogen protection, the octavinyl polyhedral oligomeric silsesquioxane reacts with the polystyrene-polydiolefin lithium compound of step (2) to obtain an eight-arm star-shaped thermoplastic elastomer copolymer.

Alternatively, the method for preparing the eight-arm star-shaped styrene-based thermoplastic elastomer copolymer includes the following steps, (4) Under nitrogen protection, a lithium compound initiates polymerization of styrene and diphenylethylene to obtain polystyrene/diphenylethylene Ethylene lithium compound.

(5) Under nitrogen protection, the polystyrene/diphenylethylene lithium compound in step (4) initiates diolefin polymerization to obtain a polystyrene/diphenylethylene-polydiolefin lithium compound.

(6) Under nitrogen protection, the octavinyl polyhedral oligomeric silsesquioxane reacts with the polystyrene/ diphenylethylene-polydiolefin lithium compound of step (5) to obtain an eight-arm star-shaped thermoplastic elastomer copolymer.

In the above technical solution, in step (1), the molar ratio of the lithium compound to styrene is from (1:10) to (1:200).

In step (2), the molar ratio of the poly(styryl)lithium(PS— Li) to the diolefin is from (1:210) to (1:630).

In step (3), the molar ratio of the octavinyl polyhedral oligomeric silsesquioxane to the polystyrene-polydiolefin lithium compound is from (1:8.2) to (1:9).

In step (4), the molar ratio of the lithium compound, styrene, and diphenylethylene is 1:(10 to 200):(5 to 20).

In step (5), the molar ratio of the polystyrene/diphenylethylene lithium compound to the diolefin is from (1:210) to (1:630).

In step (6), the molar ratio of the octavinyl polyhedral oligomeric silsesquioxane to the polystyrene/diphenylethylene-polydiolefin lithium compound is from (1:8.2) to (1:9).

In the above technical scheme: the polymerization is at room temperature for 6 to 12 hours in step (1), which is at room temperature for 12 to 24 hours in step (2), at room temperature for 1 to 2 hours in step (3), at room temperature for 12 to 24 hours in step (4), at room temperature for 12 to 24 hours in step (5), at room temperature for 1 to 2 hours in step (6).

In the above technical scheme: the reactions in steps (1) to (6) are carried out in a solvent; the lithium compound is sec-BuLi or n-butyllithium; the diolefin is butadiolefin or isoprene; the steps (there is no need to use catalysts and catalyst ligands in the reaction process from (1) to (6).

In the above technical scheme: in step (3), anhydrous methanol is used to terminate the reaction; in step (6), anhydrous methanol is used to terminate the reaction. Preferably, in step (3), the molar ratio of the eight-arm star-shaped polystyrene-polyisoprene lithium compound to anhydrous methanol is from (1:16) to (1:80); in step (6), the molar ratio of the eight-arm star-shaped polystyrene/diphenylethylene-polyisoprene lithium compound to anhydrous methanol is from (1:16) to (1:80).

The method for preparing the above-mentioned eight-arm star-shaped thermoplastic elastomer copolymer, specific steps are as follows:

(1) Synthesis of poly(styryl) lithium compound (PS—Li): For a typical anionic polymerization at room temperature, under nitrogen protection, with the styrene as the monomer, the sec-BuLi as initiator, anhydrous benzene or cyclohexane as solvent, to obtain the poly(styryl) lithium(PS—Li) solution.

(2) Synthesis of polystyrene-b-polyisoprene lithium compound (PS—PI—Li): For a typical anionic polymerization at room temperature, under nitrogen protection, with the poly(styryl)lithium(PS—Li) in step (1) as the macroinitiator, anhydrous benzene or cyclohexane as solvent, isoprene as monomer, to obtain polystyrene-polyisoprene lithium compound (PS—PI—Li).

(3) Synthesis of eight-arm star-shaped polystyrene-polyisoprene thermoplastic elastomer copolymer: Under nitrogen protection at room temperature, with anhydrous benzene or cyclohexane as solvent, octavinyl polyhedron oligomerization the siloxane reacts with the polystyrene-polyisoprene lithium compound in step (2), and is terminated with anhydrous methanol to obtain an eight-arm star-shaped polystyrene-polyisoprene thermoplastic elastomer copolymer.

Alternatively, the method for preparing the eight-arm star-shaped styrene-based thermoplastic elastomer copolymer specifically includes the following steps: (4) Preparation of polystyrene/diphenylethylene lithium compound: For a anionic polymerization at room temperature, under nitrogen protection, styrene or diphenylethylene phenylethylene is a monomer, sec-BuLi is an initiator, anhydrous benzene or cyclohexane as solvent, to obtain a polystyrene/diphenylethylene lithium compound.

(5) Preparation of polystyrene/diphenylethylene-polyisoprene lithium compound: For an anionic polymerization at room temperature, under nitrogen protection, the polystyrene/diphenylethylene lithium compound in step (4) as a macroinitiator, and anhydrous benzene or cyclohexane as a solvent, isoprene as a monomer, to obtain a polystyrene/diphenylethylene-polyisoprene lithium compound.

(6) Preparation of eight-arm star-shaped polystyrene/diphenylethylene-polyisoprene thermoplastic elastomer copolymer: For a anionic polymerization at room temperature, under nitrogen protection, with anhydrous benzene or cyclohexane as the solvent, with octavinyl the polyhedral oligomeric silsesquioxane reacts with the polystyrene/diphenylethylene-polyisoprene lithium compound in step (5), and the eight-arm star-shaped polystyrene/diolefin phenylethylene-polyisoprene thermoplastic elastomer copolymer compound is obtained after terminating with anhydrous methanol.

In the present invention, after the steps (3) and (6) are reacted, the product is purified separately, including the following steps: Purification of eight-arm star-shaped thermoplastic elastomer copolymer: After the reaction, the reaction liquid is rotated evaporator was concentrated and dropped into anhydrous methanol to precipitate. The precipitate was washed with anhydrous methanol and dried under vacuum, and then dissolved in toluene to obtain a solution. Then, anhydrous ethanol was added dropwise until the solution appeared turbid, and then heated until the solution was transparent, and then stood still. After layering, the lower transparent phase is removed from the solvent and precipitated in anhydrous methanol. The precipitate is filtered and dried to obtain an eight-arm star-shaped thermoplastic elastomer copolymer.

The present invention discloses the application of sec-BuLi or n-BuLi in the preparation of the above-mentioned eight-arm star-shaped thermoplastic elastomer copolymer and the application of the above-mentioned eight-arm star-shaped thermoplastic elastomer copolymer in the preparation of polymer materials.

The present invention uses the living anionic polymerization method to quickly and efficiently prepare the eight-arm star-shaped thermoplastic elastomer copolymer under mild reaction conditions, and realizes the precise control of the structure of the star polymer; the living anionic polymerization method can control the polymer The molecular weight and molecular weight distribution are controlled more precisely, and there are basically no side reactions; the use of octavinyl polyhedral oligomeric silsesquioxane and the active chain of the polymer can quickly and efficiently couple the reaction, which can greatly shorten preparation time of the eight-arm star-shaped thermoplastic elastomer copolymer.

In the above technical scheme, specific steps are as follows, (1) Synthesis of poly(styryl)lithium(PS—Li): For a typical anionic polymerization at room temperature for 12 h, under nitrogen protection, the monomer of styrene stored in ampoule was added into the sec-BuLi as initiator, anhydrous benzene or cyclohexane as solvent, to obtain the poly(styryl)lithium(PS—Li) solution, and the above specific response can be expressed as follows,

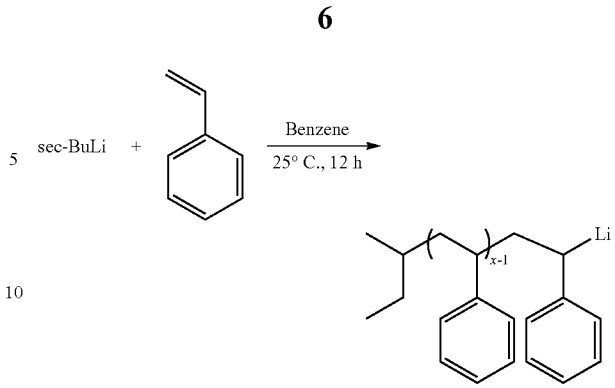

(2) Synthesis of polystyrene-b-polyisoprene lithium compound (PS—PI—Li): For a typical anionic polymerization for 12 h, under nitrogen protection, with the poly(styryl)lithium(PS—Li) in step (1) as the macro-initiator, anhydrous benzene or cyclohexane as solvent, isoprene as monomer, to obtain polystyrene-polyisoprene lithium compound (PS—PI—Li). And the above specific response can be expressed as follows,

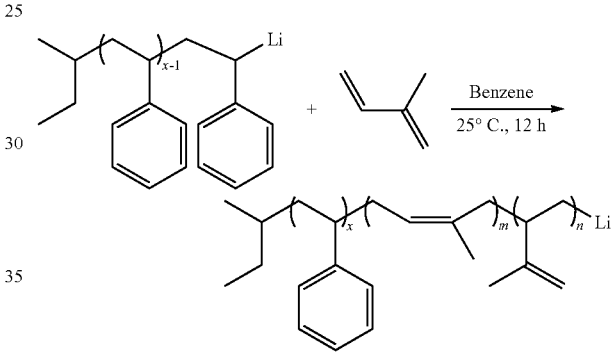

(3) Synthesis of poly(styrene-co-1,1-diphenylethylene)-b-polyisoprene lithium compound ((PS—PI)$_8$POSS): Under nitrogen protection at room temperature, with anhydrous benzene or cyclohexane as solvent, octavinyl polyhedron oligomerization the siloxane reacts with the polystyrene-polyisoprene lithium compound in step (2), and is terminated with anhydrous methanol to obtain (PS—PI)$_8$POSS. And the above specific response can be expressed as follows,

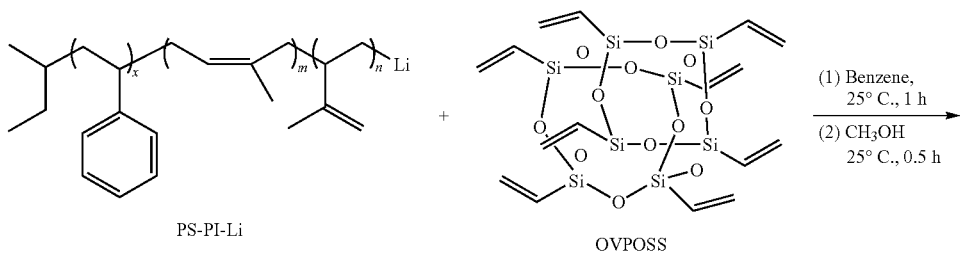

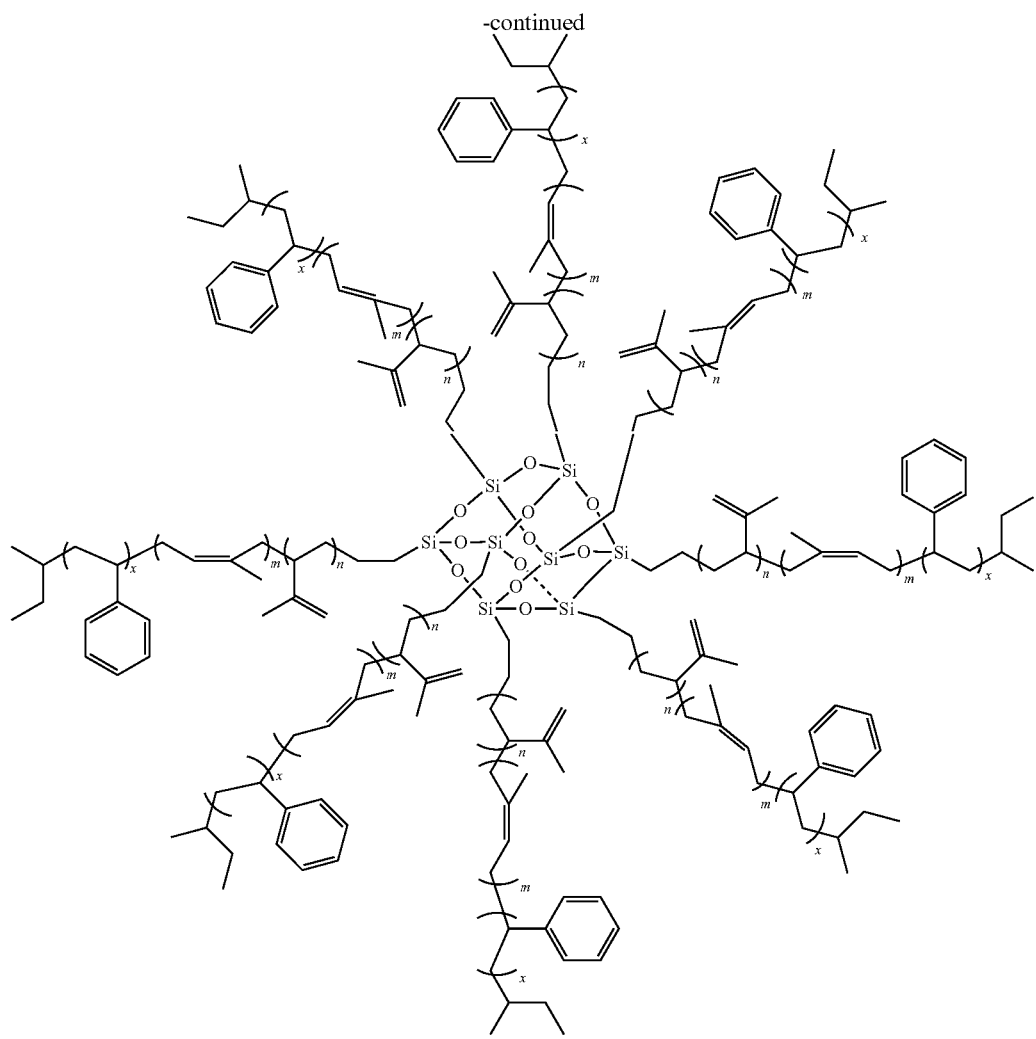

(4) Synthesis of polystyrene/diphenylethylene lithium compound (PSD-Li): For a typical anionic polymerization at room temperature for 12 h, under nitrogen protection, the reaction device was added the sec-BuLi initiator, with anhydrous benzene or cyclohexane as solvent, First added diphenylethylene, then added styrene to obtain the polystyrene/diphenylethylene lithium compound (PSD-Li), and the reaction formula is as follows,

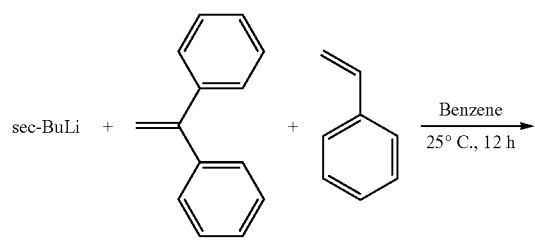

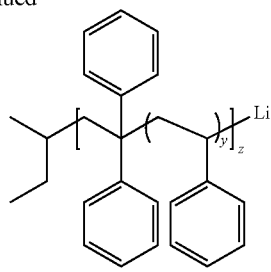

(5) Preparation of polystyrene/diphenylethylene-polyisoprene lithium (PSD-PI—Li) For a anionic polymerization at room temperature, under nitrogen protection for 12 h, the polystyrene/diphenylethylene lithium (PSD-Li) in step (4) as a macroinitiator, and anhydrous benzene or cyclohexane as a solvent, isoprene as a monomer, to obtain PSD-PI—Li, and the above specific response can be expressed as follows,

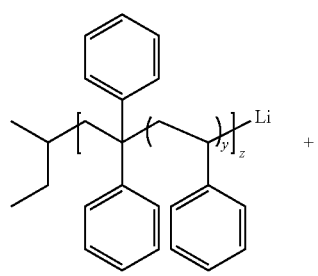
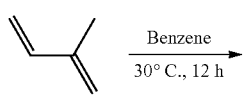

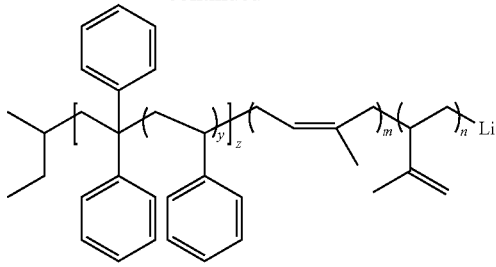

(6) Preparation of eight-arm star-shaped polystyrene/diphenylethylene-polyisoprene thermoplastic elastomer copolymer ((PSD-PI)$_8$POSS): For a anionic polymerization at room temperature, under nitrogen protection for 1 to 2 h, with anhydrous benzene or cyclohexane as the solvent, with OVPOSS reacts with the PSD-PI—Li in step (5), and the (PSD-PI)$_8$POSS was obtained after terminating with anhydrous methanol. The above specific response can be expressed as follows:

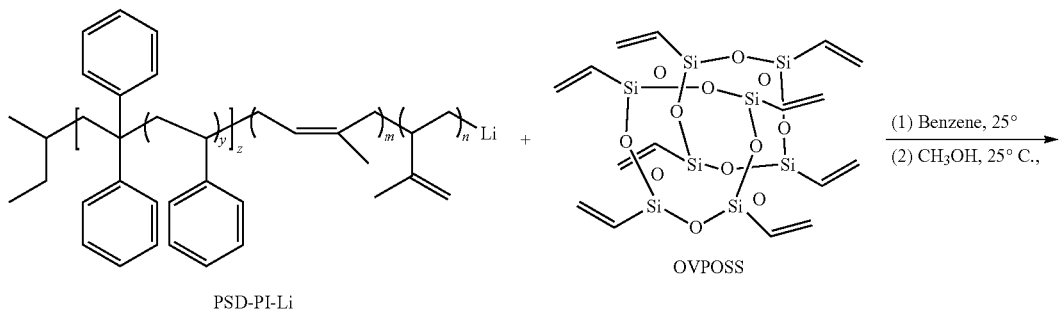

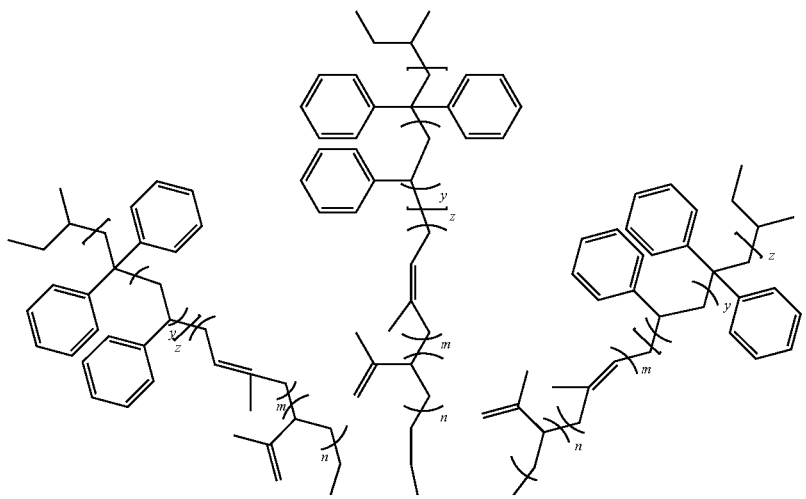

-continued

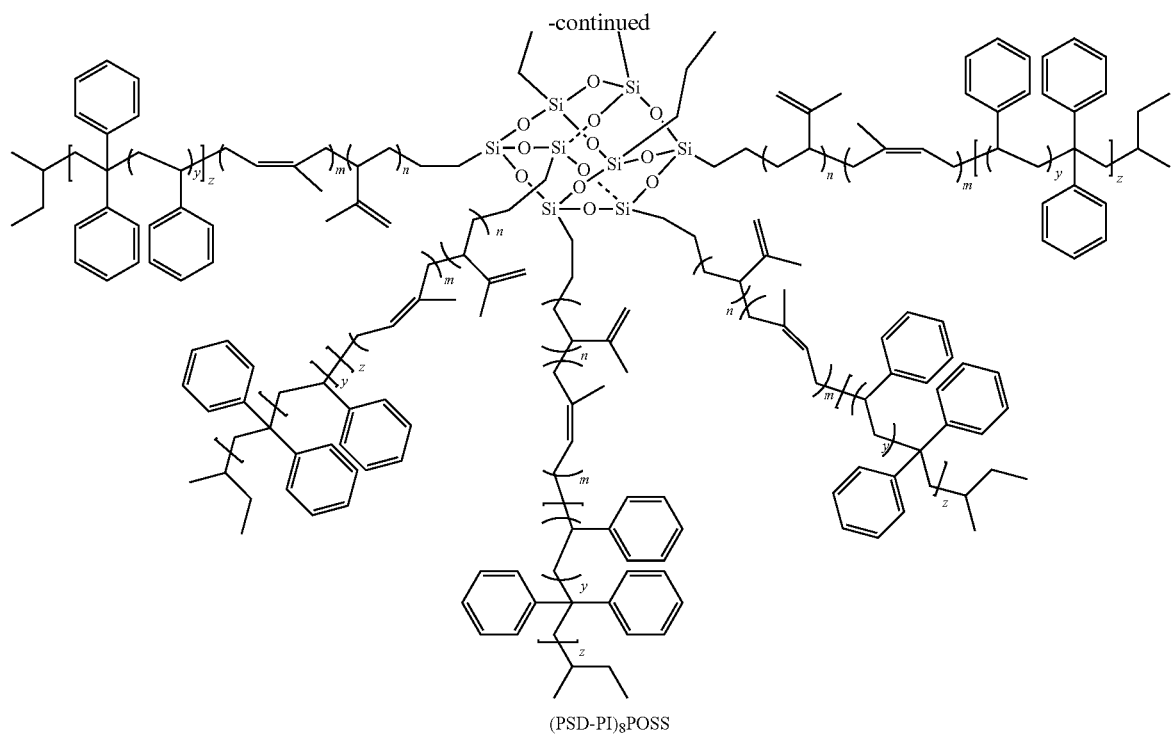

(PSD-PI)₈POSS

The eight-arm star-shaped thermoplastic elastomer copolymer of the present invention benefits from its unique topological branched structure, and the hydrodynamic volume of the star polymer is highly restricted, the polymer making this type of polymer in solution or molten state compared to linear has less winding state, which gives it lower viscosity, smaller hydrodynamic volume, smaller radius of rotation, low crystallinity, etc., and has good processing properties, thus becoming an excellent raw materials to prepare for TPE materials.

In the above technical solution, in the steps (3) and (6), after the reaction is completed, the products are purified respectively, and the specific purification process includes the following steps.

(3) Purification treatment of eight-arm star-shaped polystyrene-polyisoprene thermoplastic elastomer copolymer ((PS—PI)₈POSS): After the termination of the reaction, the reaction solution is concentrated with a rotary evaporator, and anhydrous methanol is added dropwise Precipitate out, and wash it with anhydrous methanol three times, put it into a vacuum drying oven, vacuum and dry at from 30 to 40° C. for 12 to 24 hours to obtain a crude product. Then dissolve the crude product with toluene until it becomes transparent, and add absolute ethanol dropwise until the solution appears turbid, then treat it at from 30 to 35° C. until the solution is transparent, and then transfer the solution to a separatory funnel while it is hot, and let stand for layering. After removing the solvent, the transparent phase is precipitated in anhydrous methanol, and the precipitate is filtered and dried to obtain a translucent elastic block solid.

(6) Eight-arm star-shaped polystyrene/diphenylethylene-polyisoprene thermoplastic elastomer copolymer. Purification treatment of ((PS—PI)₈POSS): After the termination of the reaction, the reaction solution was concentrated with a rotary evaporator, dropped into anhydrous methanol to precipitate out, and washed three times with anhydrous methanol, and placed in a vacuum drying oven. The crude product was obtained after vacuum drying at from 30 to 40° C. for from 12 to 24 h. Then dissolve the crude product with toluene until it becomes transparent, and add absolute ethanol dropwise until the solution appears turbid, then treat it at from 30 to 35° C. until the solution is transparent, and then transfer the solution to a separatory funnel while it is hot, and let stand for layering. After removing the solvent, the transparent phase is precipitated in anhydrous methanol, and the precipitate is filtered and dried to obtain a translucent elastic block solid.

Beneficial Effects

The main advantages of the present invention are,
1. The invention adopts a living anionic polymerization method to efficiently synthesize an eight-arm star-shaped thermoplastic elastomer copolymer capable of accurately controlling molecular weight and molecular weight distribution.
2. In the present invention, the diphenylethylene unit is introduced into the hard segment unit of the thermoplastic elastomer copolymer, which can increase the glass transition temperature of the elastomer hard segment, and can easily adjust the glass transition temperature of the material obtained elastomer copolymer by adjusting the amount of the diphenylethylene unit.

EXAMPLES

The technical scheme of the present invention is further elaborated in combination with attached Figures and Examples.

Example 1: Preparation of (PS—PI)$_8$POSS (1) Synthesis of PS—Li: Anionic polymerization at room temperature for 12 h, under nitrogen protection, the monomer of styrene (4.0 mL, 34.9 mmol) stored in ampoule was added into the sec-BuLi (0.7 mL, 0.77 mmol) as initiator, anhydrous benzene (100 mL) as solvent, to obtain the poly(styryl)lithium(PS—Li) solution. 2 mL of PS—Li solution was terminated with methanol, to obtain PS solution for test characterization. If benzene was replaced with the same amount of tetrahydrofuran, the subsequent coupling reaction efficiency of the product PS—Li is very poor, and it is almost impossible to obtain an eight-arm star polymer.

Figure 1:
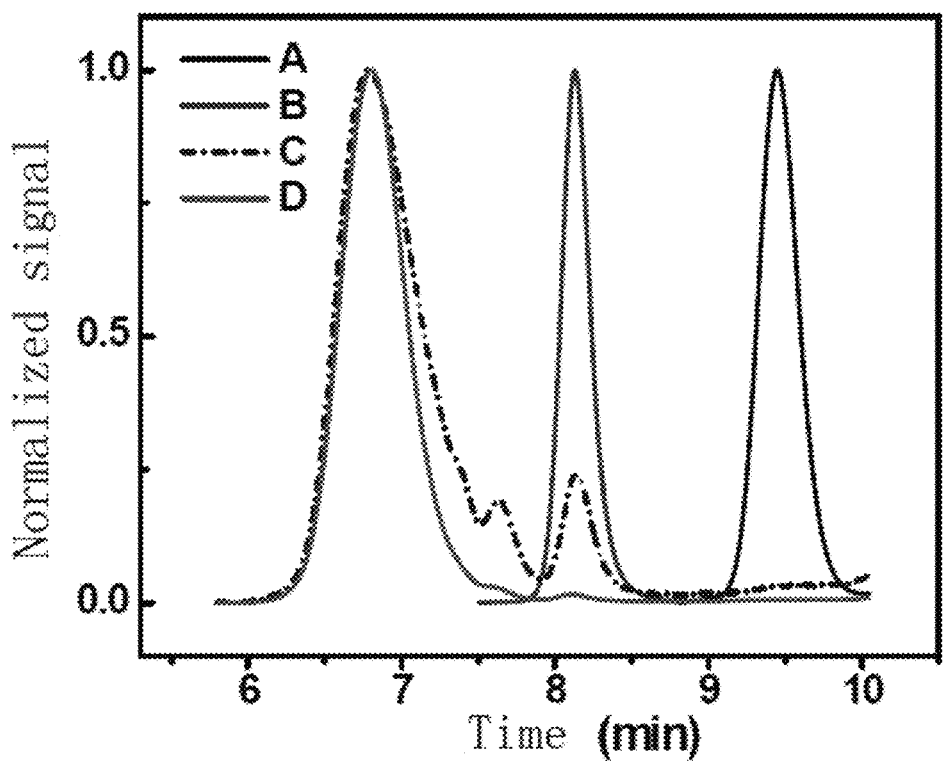
FIG. 1 shows the GPC curves of PS (A), PS—PI (B), before purification (C) and after purification (D) of (PS—PI)₈POSS in Example 1, the solvent is tetrahydrofuran (THF)
Figure 2:
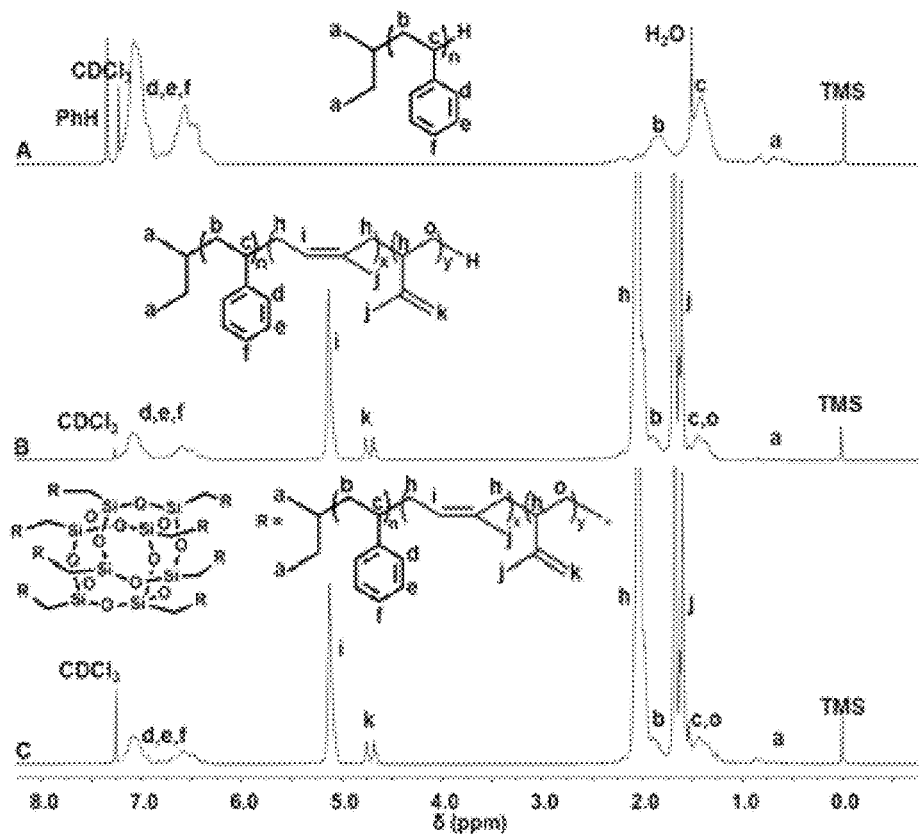
FIG. 2 shows $^1$H NMR of PS (A), PS—PI (B), after purification (C) of (PS—PI)$_8$POSS in Example 1, the solvent is CDCl$_3$.
Figure 3:
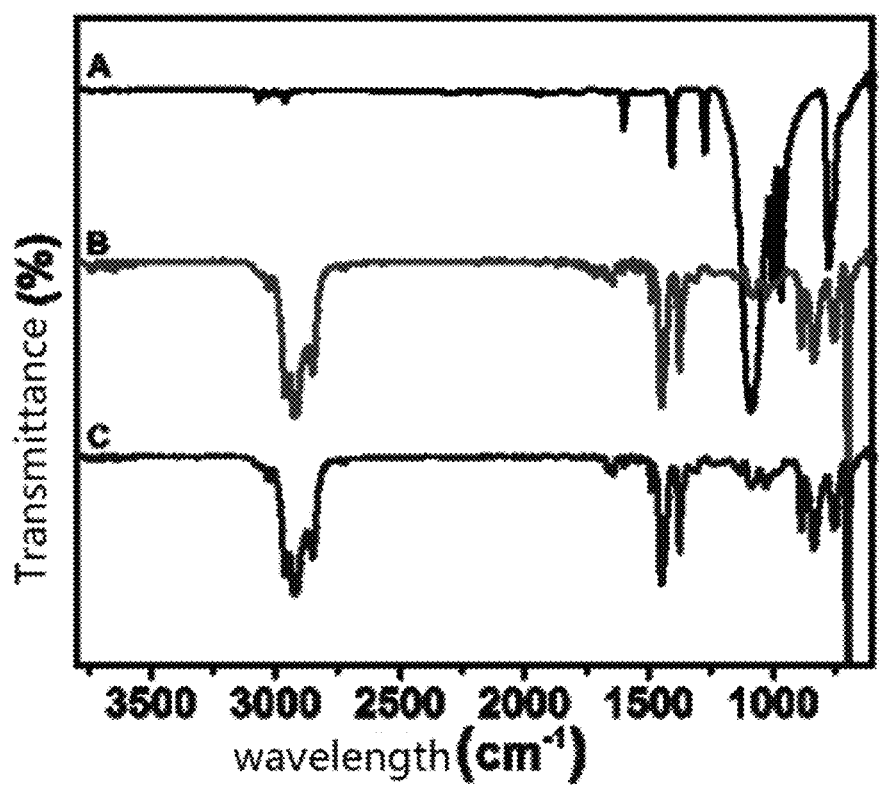
FIG. 3 shows FT-IR of PS (A), PS—PI (B), after purification (C) of (PS—PI)$_8$POSS in Example 1.

The PS solution in detached ampoule was concentrated by rotary evaporation and precipitated in cold methanol to obtain pure polymers. The solid was collected and dried at 35° C. in a vacuum oven for 24 h to obtain the white solid. All samples have been characterized by GPC, $^1$H NMR and FT-IR. FIG. 1 (A), FIG. 2 (A) and FIG. 3 (A) respectively show GPC, $^1$H NMR and FT-IR of PS, which verified the chemical structure of PS. From the $^1$H NMR, the attribution of the proton peak corresponding to the polymer structure can be found. From the GPC ($\overline{M}_n$=3.9 kg·mol$^{-1}$, $\overline{M}_w/\overline{M}_n$=1.05). It can be seen that the peak shape of the PS polymer is symmetrical narrow dispersed.

(2) Synthesis of PS—PI—Li: Anionic polymerization at room temperature for 12 h, under nitrogen protection, isoprene (15.5 g, 227.2 mmol) and anhydrous benzene (100 mL) was added into the PS—Li solution obtained in the above step (1). 2 mL of PS—PI—Li solution was terminated with methanol, to obtain PS—PI solution.

The PS—PI solution in detached ampoule was concentrated by rotary evaporation and precipitated in cold methanol to obtain pure polymers. The solid was collected and dried at 35° C. in a vacuum oven for 24 h to obtain the white solid PS—PI. All samples have been characterized by GPC, $^1$H NMR and FT-IR. FIG. 1 (B), FIG. 2 (B) and FIG. 3 (B) respectively show GPC, $^1$H NMR and FT-IR of PS—PI, which verified the chemical structure of PS—PI. From the $^1$H NMR, the attribution of the proton peak corresponding to the polymer structure can be found. From the GPC ($\overline{M}_n$=28.6 kg·mol$^{-1}$, $\overline{M}_w/\overline{M}_n$=1.03). It can be seen that the peak shape of the PS—PI polymer is symmetrical narrow dispersed.

(3) Synthesis of (PS—PI)$_8$POSS:

The coupling reaction was carried out at room temperature for 2 hours under nitrogen protection, mixed the PS—PI—Li solution obtained in step (2) above and OVPOSS (73.5 mg, 0.12 mmol) in benzene (10 mL) and the reaction was terminated with anhydrous methanol. After the reaction, the reaction solution was concentrated by rotary evaporation and precipitated in cold methanol to obtain crude product. The solid was collected and dried at 35° C. in a vacuum oven for 24 h to obtain the pure polymers. The crude product is purified by fractional precipitation to obtain a transparent elastic block solid, which is the eight-arm star-shaped thermoplastic elastomer copolymer.

Figure 4:
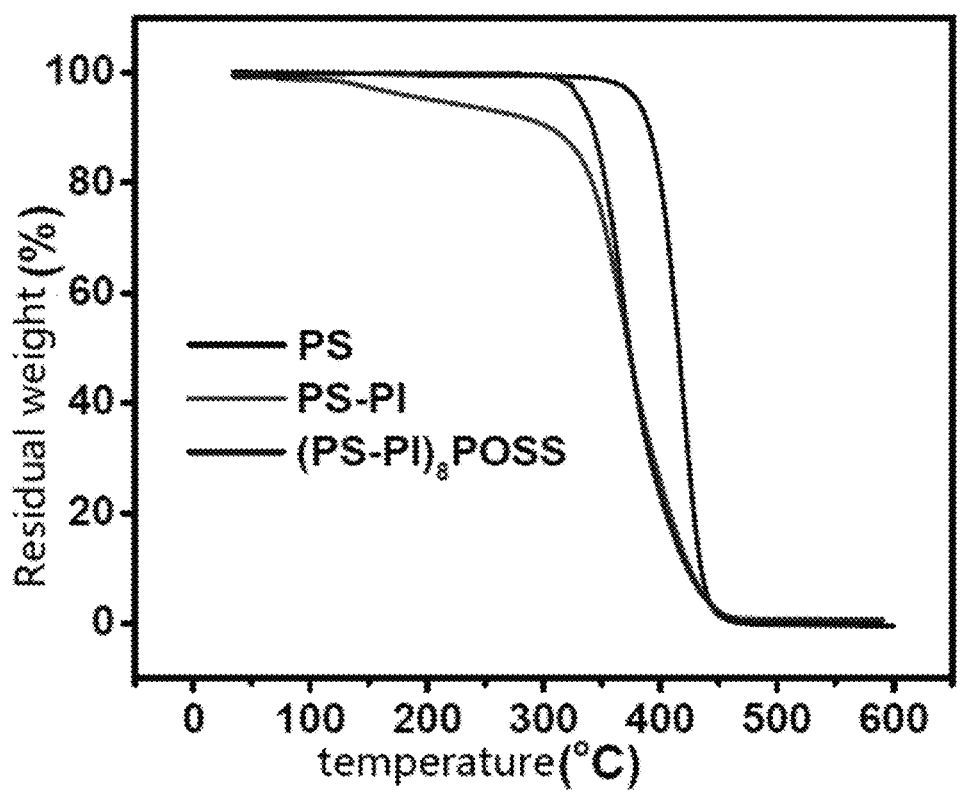
FIG. 4 shows thermal weight loss curves of PS (A), PS—PI (B), after purification (C) of (PS—PI)$_8$POSS in Example 1, nitrogen, 10° C./min.
Figure 5:
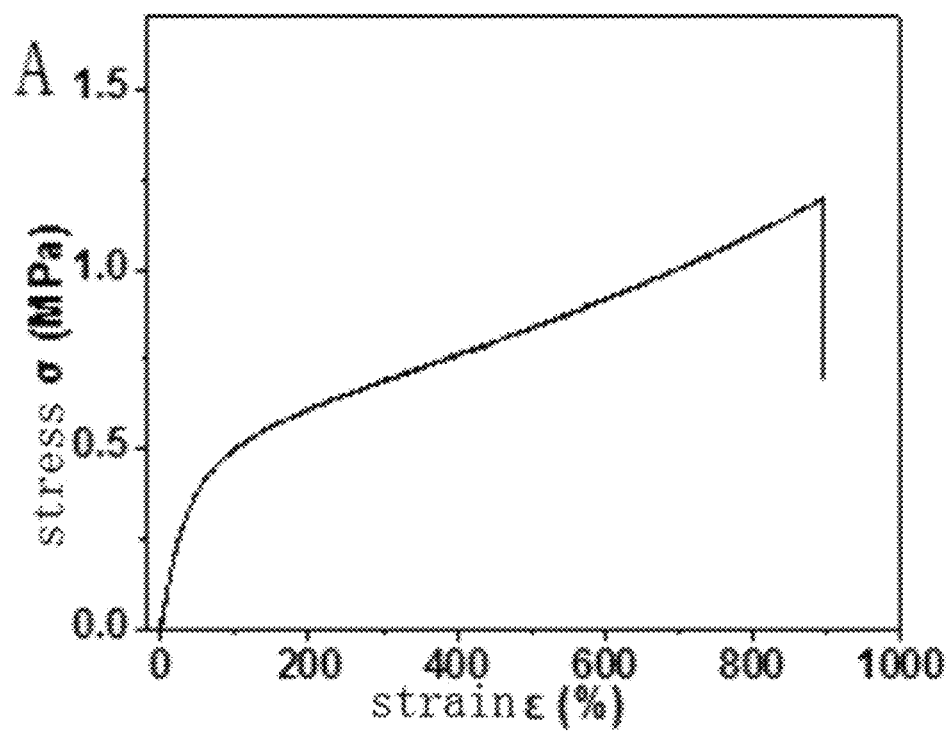
FIG. 5 shows the stress-strain curve of after purification of (PS—PI)$_8$POSS in Example 1 with the crosshead speed of 50 mm/min.

All samples have been characterized by GPC, $^1$H NMR and FT-IR. FIGS. 1 (C) and (D), FIG. 2 (C) and FIG. 3 (C) respectively show GPC of (PS—PI)$_8$POSS crude product. GPC, $^1$H NMR and FT-IR of the pure product of (PS—PI)$_8$POSS which verified the chemical structure. From the $^1$H NMR, the attribution of the proton peak corresponding to the polymer structure can be found. From the GPC, the before purification of the crude product there were multiple sets of peak, the peak shape of the after purification of (PS—PI)$_8$POSS is symmetrical narrow dispersed ($\overline{M}_n$=168.5 kg·mol$^{-1}$, $\overline{M}_w/\overline{M}_n$=1.12). FIG. 4 shows thermal weight loss curves of PS, PS—PI and (PS—PI)$_8$POSS. Compared with the linear polymer PS—PI, the (PS—PI)$_8$POSS has higher thermal decomposition temperature and better thermal stability. FIG. 5 shows the stress-strain curve of (PS—PI)$_8$POSS. It can be seen from the figure that its elongation at break is 900% and the average breaking strength is 1.2 MPa.

Example 2: Preparation of (PS—PI)$_8$POSS with DPE Monomers (1) Synthesis of PSD-Li: Take the Molar Ratio of Styrene to Diphenylethylene is 1 to 0.16 (St:DPE=1:0.16) for an Example.

Anionic polymerization at room temperature for 12 h, under nitrogen protection, the monomer of styrene (4.0 mL, 34.9 mmol) stored in ampoule was added into the sec-BuLi (0.44 mL, 0.56 mmol) as initiator, anhydrous benzene (100 mL) as solvent, added diphenylethylene(1.2 mL, 6.79 mmol) and styrene (2.6 mL, 22.7 mmol) to obtain PSD$_{0.16}$-Li solution. 2 mL of PSD$_{0.16}$-Li solution was terminated with methanol, to obtain PSD$_{0.16}$-Li solution for test characterization. The PSD solution in detached ampoule was concentrated by rotary evaporation and precipitated in cold methanol, the solid was collected and dried at 35° C. in a vacuum oven for 24 h to obtain the white solid PSD$_{0.16}$. The other two samples, PSD$_{0.37}$, PSD$_{0.54}$ were prepared by this method, and the ratio of raw materials can be changed.

- PSD$_{0.37}$: sec-BuLi (0.55 mL, 0.7 mmol), diphenylethylene (2.5 mL, 14.2 mmol), styrene (2.6 mL, 22.7 mmol);
- PSD$_{0.54}$: sec-BuLi (0.48 mL, 0.71 mmol), diphenylethylene (2.5 mL, 14.2 mmol), styrene (1.9 mL, 17 mmol).

Figure 6:
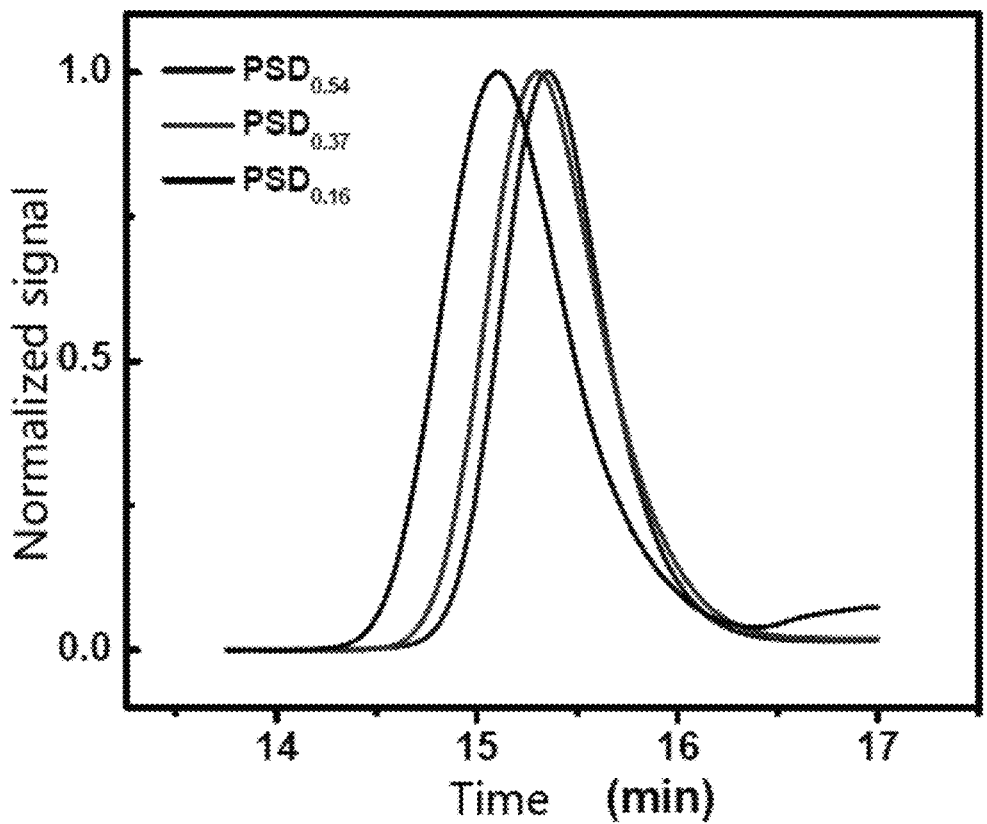
FIG. 6 shows the GPC curves of PSD$_{0.54}$ (the molar ratio of DPE monomer to St monomer is 0.54 to 1), PSD$_{0.37}$ ((the molar ratio of DPE monomer to St monomer is 0.37 to 1) and PSD$_{0.16}$ (the molar ratio of DPE monomer to St monomer is 0.16 to 1) in Example 2, the solvent is THF.
Figure 7:
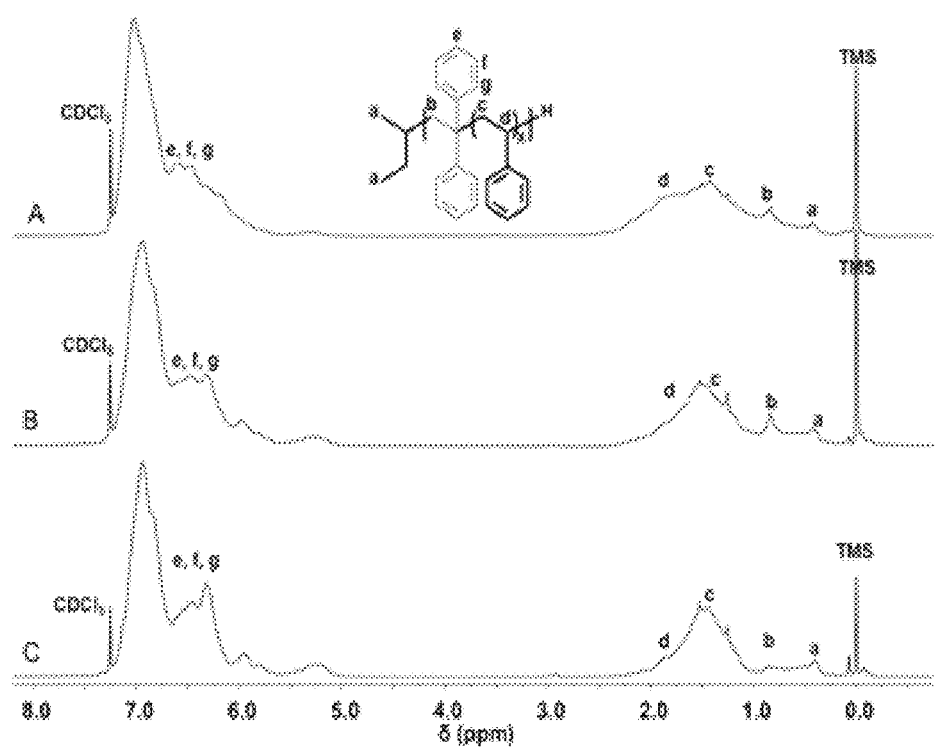
FIG. 7 shows $^1$H NMR of PSD$_{0.16}$ (A), PSD$_{0.37}$ (B) and PSD$_{0.54}$ (C) in Example 2, the solvent is CDCl$_3$.
Figure 8:
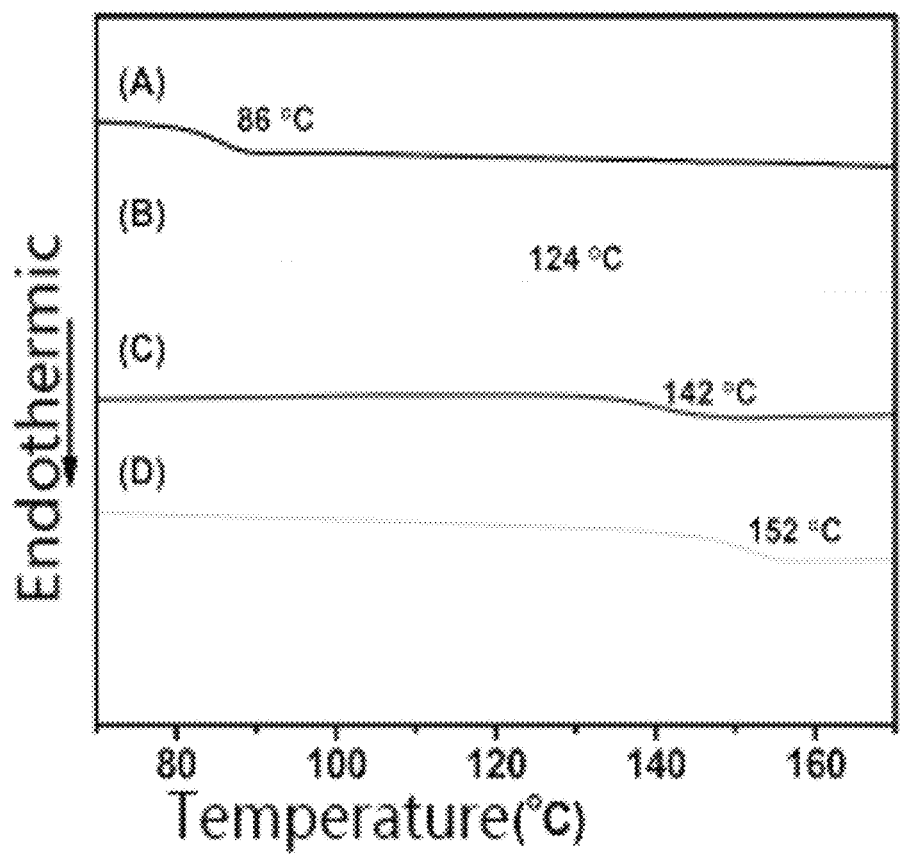
FIG. 8 shows differential scanning calorimeter (DSC) of PS (A) in Example 1 and PSD$_{0.16}$ (B), PSD$_{0.37}$ (C) and PSD$_{0.54}$ (D) in Example 2, nitrogen, 10° C./min.

The polymer was characterized by $^1$H NMR and GPC. FIGS. 6 and 7 are GPC and $^1$H NMR of PSD polymers with different DPE monomers, respectively, verifying the chemical structure of PSD with different monomers molar ratios. From GPC (PSD$_{0.54}$, $\overline{M}_n$=5.9 kg·mol$^{-1}$, $\overline{M}_w/\overline{M}_n$=1.11, PSD$_{0.37}$, $\overline{M}_n$=6.0 kg·mol$^{-1}$, $\overline{M}_w/\overline{M}_n$=1.14, PSD$_{0.16}$, $\overline{M}_n$=7.6 g·mol$^{-1}$, $\overline{M}w/\overline{M}_n$=1.14), it can be seen that the peak shape of the PS—PI polymer is symmetrical narrow dispersed. From the $^1$H NMR, the attribution of the proton peak corresponding to the polymer structure can be found. FIG. 8 is the DSC of PSD polymer with different DPE monomers. It can be seen that with the increase of DPE monomers, from 1:0 (A), 1:0.16 (B), 1:0.37 (C) to 1:0.54 (D), the T$_g$ of the polymers are also increased accordingly, that is, the T$_g$ of polymer can be adjusted by changing the content of the DPE monomers.

(2) Synthesis of PSD-PI—Li: Take the molar ratio of styrene to diphenylethylene is 1 to 0.16 (St:DPE=1:0.16) for an example.

Anionic polymerization at room temperature for 12 h, under nitrogen protection, added isoprene (13.0 g, 191.0 mmol) and benzene (200 mL) to the PSD$_{0.16}$-Li solution obtained in step (1) above, the polystyrene/diphenylethylene-polyisoprene lithium compound (PSD$_{0.16}$-PI—Li) solution was obtained. 2 mL of PSD$_{0.16}$-PI—Li solution was terminated with methanol, to obtain PSD$_{0.16}$-PI solution for test characterization. The PSD$_{0.16}$-PI solution in detached ampoule was concentrated by rotary evaporation and precipitated in cold methanol, the solid was collected and dried at 35° C. in a vacuum oven for 24 h to obtain the white solid PSD$_{0.16}$-PI. The other two samples, PSD$_{0.37}$-PI, PSD$_{0.54}$-PI were prepared by this method, and the mass of DPE monomers can be changed.

- PSD$_{0.37}$-PI: isoprene (14.43 g, 211.9 mmol);
- PSD$_{0.54}$-PI: isoprene (11.7 g, 172 mmol).

Figure 9:
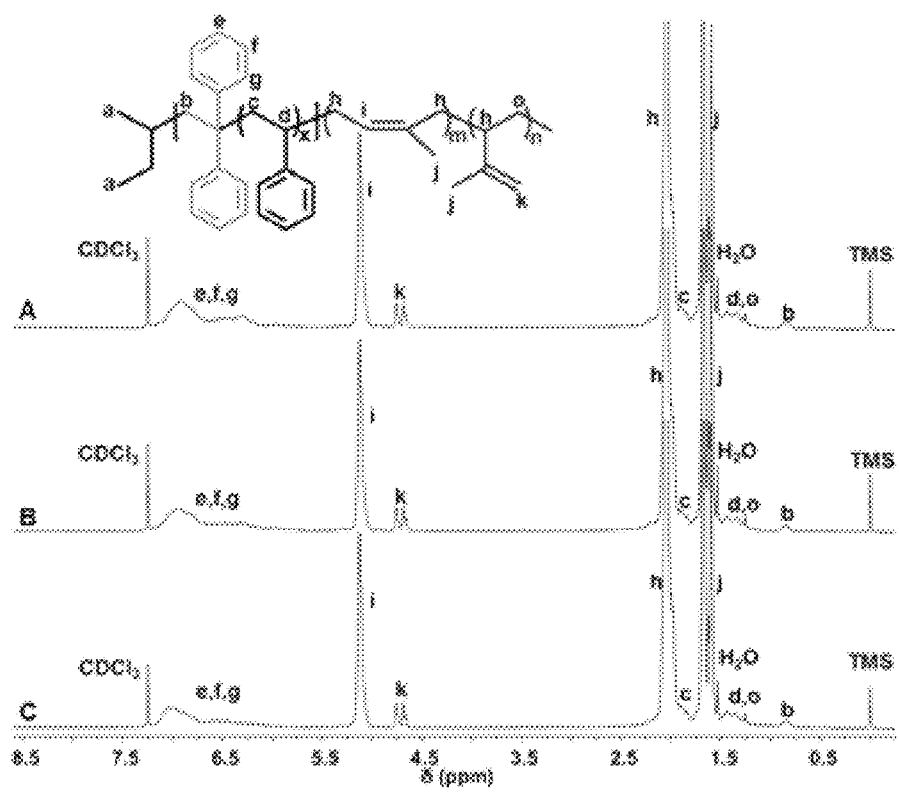
FIG. 9 shows $^1$H NMR of PSD$_{0.54}$-PI (A), PSD$_{0.37}$-PI (B), PSD$_{0.16}$-PI (C) in Example 2, the solvent is CDCl$_3$.
Figure 10:
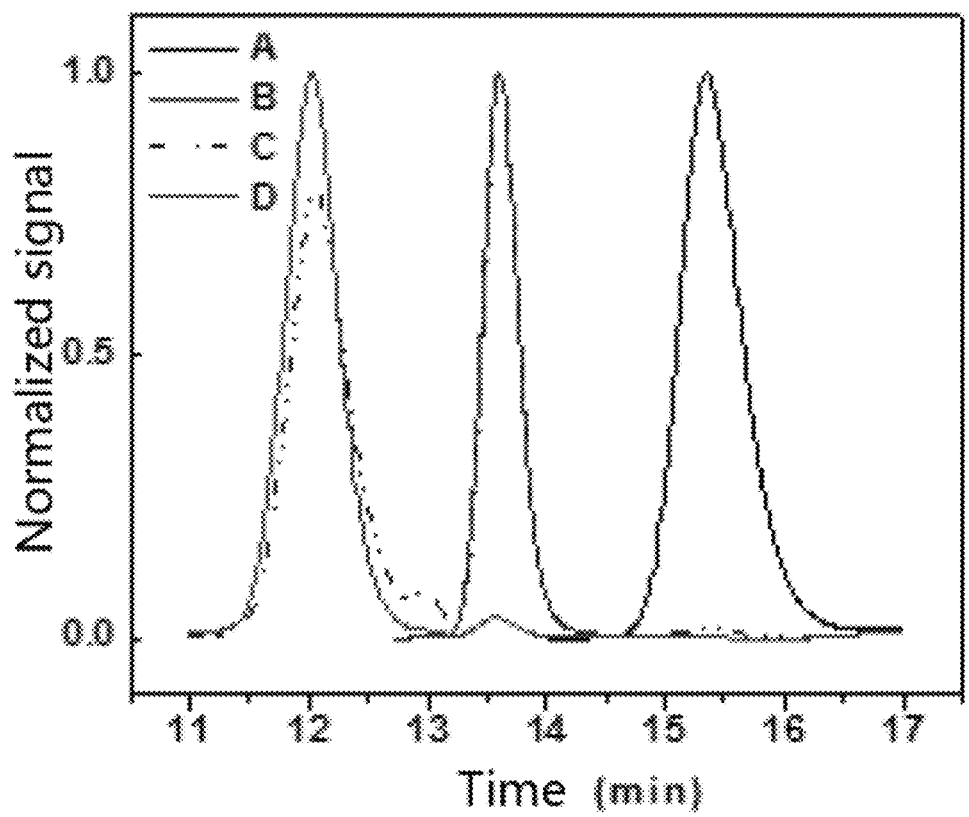
FIG. 10 shows the GPC curves of PSD$_{0.16}$ (A), PSD$_{0.16}$-PI (B), before purification (C) and after purification (D) of (PSD$_{0.16}$-PI)$_8$POSS in Example 2, the solvent is THF.
Figure 11:
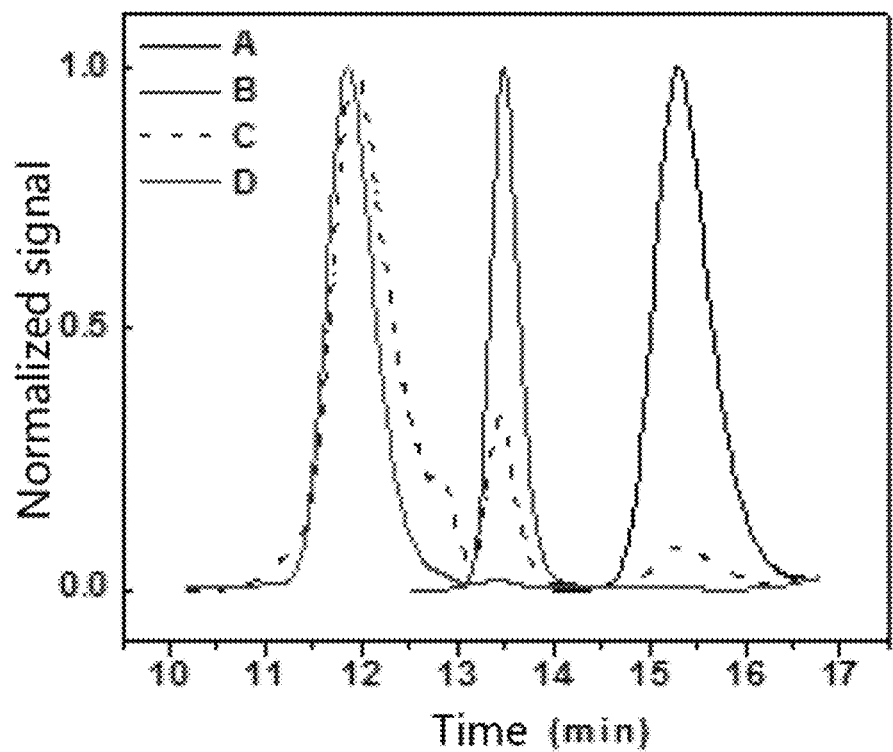
FIG. 11 shows the GPC curves of PSD$_{0.37}$ (A), PSD$_{0.37}$-PI (B), before purification (C) and after purification (D) of (PSD$_{0.37}$-PI)$_8$POSS in Example 2, the solvent is THF.
Figure 12:
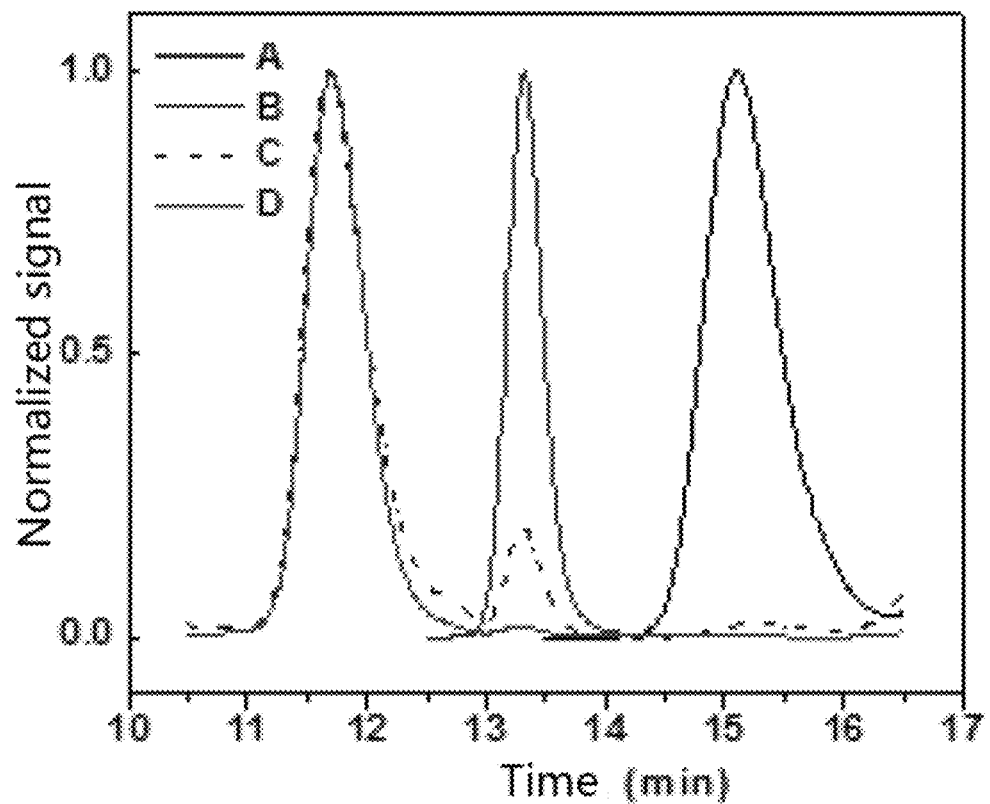
FIG. 12 shows the GPC curves of PSD$_{0.54}$ (A), PSD$_{0.54}$-PI (B), before purification (C) and after purification (D) of (PSD$_{0.54}$-PI)$_8$POSS in Example 2, the solvent is THF.

They were characterized by $^1$H NMR and GPC. FIG. 9, FIG. 10 (B), FIG. 11 (B) and FIG. 12 (B) show $^1$H NMR and GPC of PSD$_{0.16}$-PI, PSD$_{0.37}$-PI and PSD$_{0.54}$-PI with different DPE monomers verify the chemical structure of PSD-PI. From the $^1$H NMR, the attribution of the proton peak corresponding to the polymer structure can be found, from the GPC (PSD$_{0.54}$-PI, $\overline{M}_n$=41.5 kg·mol$^{-1}$, $\overline{M}_w/\overline{M}_n$=1.03, PSD$_{0.37}$-PI, $\overline{M}_n$=47.2 kg·mol$^{-1}$, $\overline{M}_w/\overline{M}_n$=1.03, PSD$_{0.16}$-PI, $\overline{M}_n$=56.1 kg·mol$^{-1}$, $\overline{M}_w/\overline{M}_n$=1.03), it can be seen that the peak shape of the PS—PI polymer is symmetrical narrow dispersed.

(3) Synthesis of (PSD-PI)$_8$POSS: Take the molar ratio of styrene to diphenylethylene is 1 to 0.16 (St:DPE=1:0.16) for an example.

The coupling reaction was carried out at room temperature for 2 h, under nitrogen protection, mixed PSD$_{0.16}$-PI—Li solution obtained in step (2) above and OVPOSS (36 mg, 0.057 mmol) and benzene (10 mL) and the reaction was terminated with anhydrous methanol. After the reaction, the reaction solution was concentrated by rotary evaporation and precipitated in cold methanol to obtain crude product. The solid was collected and dried at 35° C. in a vacuum oven for 24 h to obtain the pure polymers. The crude product is purified by fractional precipitation to obtain a transparent elastic block solid, which is the (PSD$_{0.16}$-PI)$_8$POSS.

The other two samples, (PSD$_{0.37}$-PI)$_8$POSS, (PSD$_{0.54}$-PI)$_8$POSS were prepared by this method, and the amount of raw material OVPOSS can be changed.

- (PSD$_{0.37}$-PI)$_8$POSS: OVPOSS (50 mg, 0.079 mmol);
- (PSD$_{0.54}$-PI)$_8$POSS: OVPOSS (40 mg, 0.063 mmol).

All samples have been characterized by GPC. FIGS. 10 (C) and (D), FIGS. 11 (C) and (D), and FIGS. 12 (C) and (D), respectively show GPC of (PSD-PI)$_8$POSS crude product and pure polymers. the GPCs verified the chemical structure. From the before purification of the crude product there were multiple sets of peak, the peak shape of the after purification of (PSD-PI)$_8$POSS is symmetrical narrow dispersed. (PSD$_{0.16}$-PI)$_8$POSS: $\overline{M}_n$=322 kg·mol$^{-1}$, =1.11; (PSD$_{0.37}$-PI)$_8$POSS: $\overline{M}_n$=265.7 kg·mol$^{-1}$, $\overline{M}_w/\overline{M}_n$=1.12; (PSD$_{0.54}$-PI)$_8$POSS: $\overline{M}_n$=232.6 kg·mol$^{-1}$, $\overline{M}_w/\overline{M}_n$=1.10.

Figure 13:
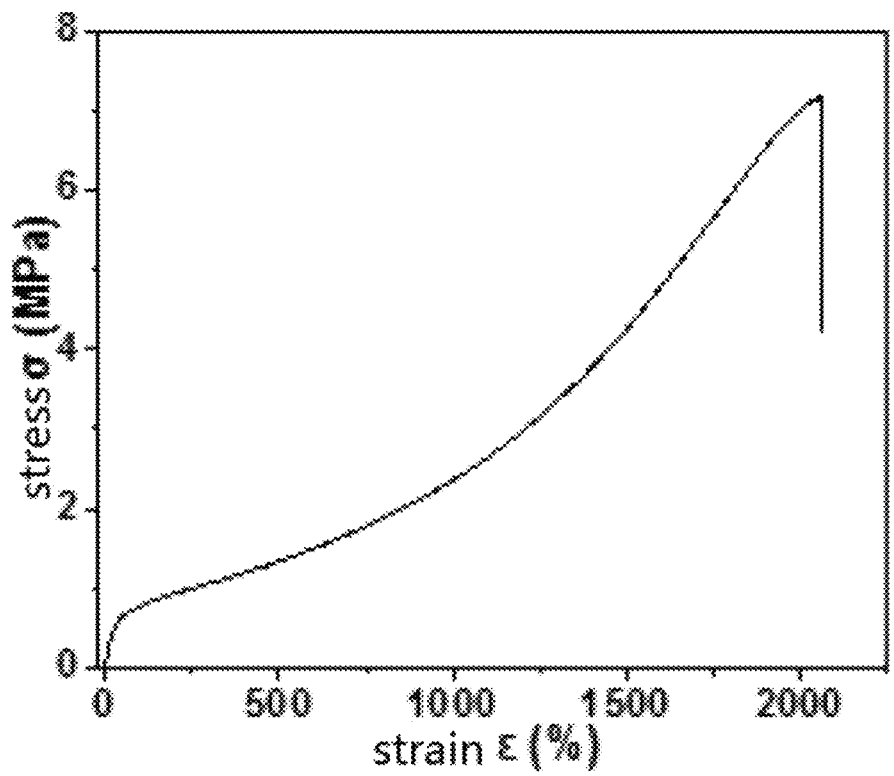
FIG. 13 shows the stress-strain curve of (PSD$_{0.16}$-PI)$_8$POSS (the molecular weight ratio of PSD to PI is 1 to 4.0) in Example 2 with the crosshead speed of 50 mm/min.
Figure 14:
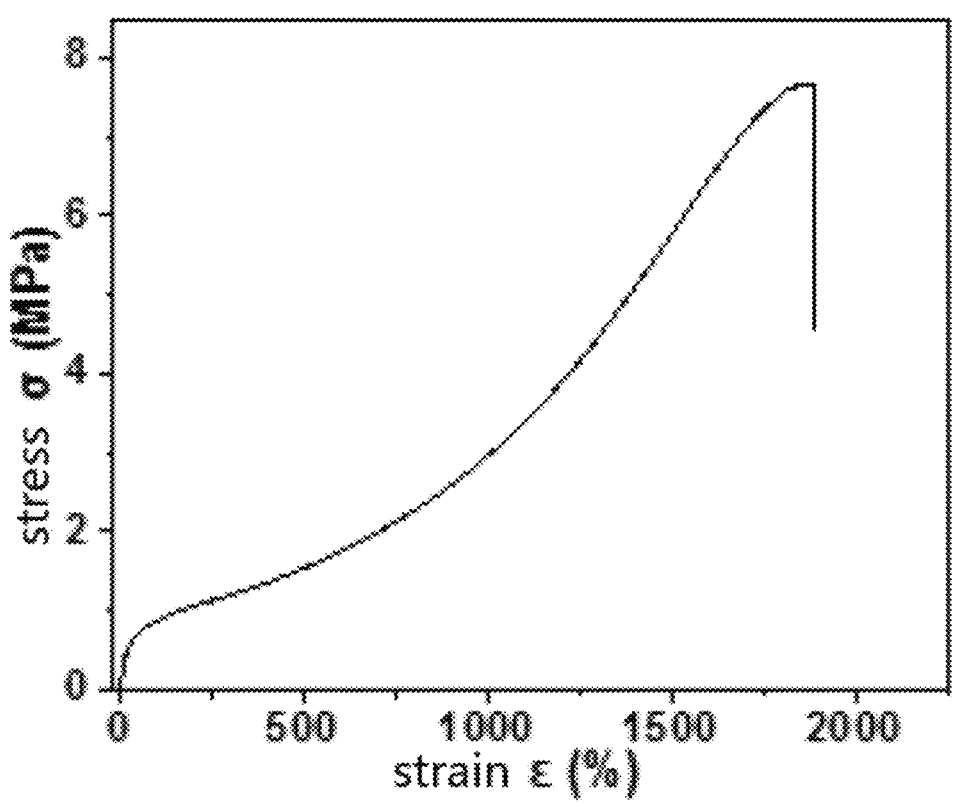
FIG. 14 shows the stress-strain curve of (PSD$_{0.37}$-PI)$_8$POSS (the molecular weight ratio of PSD to PI is 1 to 3.4) in Example 2 with the crosshead speed of 50 mm/min.
Figure 15:
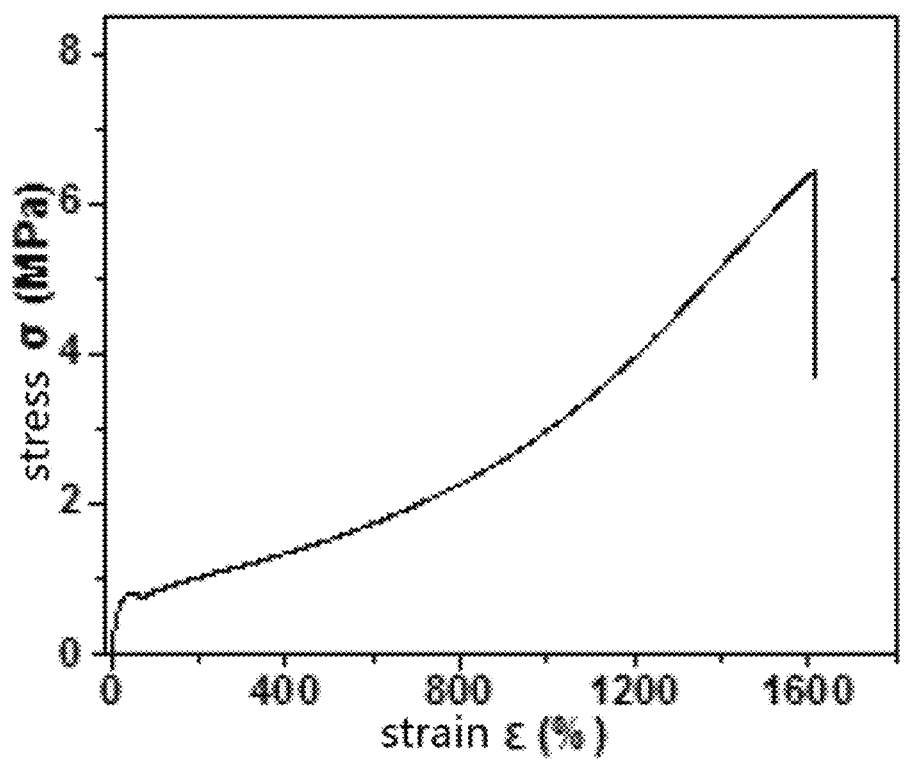
FIG. 15 shows the stress-strain curve of (PSD$_{0.54}$-PI)$_8$POSS (the molecular weight ratio of PSD to PI is 1 to 3.2) in Example 2 with the crosshead speed of 50 mm/min.

FIG. 13, FIG. 14, FIG. 15 are respectively correspond to the stress-strain curves of (PSD$_{0.16}$-PI)$_8$POSS, (PSD$_{0.37}$-PI)$_8$POSS and (PSD$_{0.54}$-PI)$_8$POSS, which can be seen from the figure their breaking elongation and breaking strength are: (PSD$_{0.16}$-PI)$_8$POSS (2060%, 7.2 MPa); (PSD$_{0.37}$-PI)$_8$POSS (1880%, 7.7 MPa); (PSD$_{0.54}$-PI)$_8$POSS (1610%, 6.4 MPa). It shows that compared with the (PS—PI)$_8$POSS in Example 1, the (PSD-PI)$_8$POSS incorporating DPE monomers have better mechanical properties.

The method disclosed by the invention has the advantages of rapid and efficient reaction, mild conditions, fewer side reactions, controllable polymer molecular weight and molecular weight distribution, etc. The obtained eight-arm star-shaped thermoplastic elastomer copolymer has a clear structure; The polymer segment obtained by copolymerization of DPE and St is used as the hard segment, which makes the eight-arm star-shaped thermoplastic elastomer copolymer have more excellent stress-strain characteristics; at the same time, diphenylethylene (DPE) and styrene (St) The polymer segment obtained by copolymerization has a higher glass transition temperature than that of polystyrene, which can increase the upper limit temperature of the star-shaped thermoplastic elastomer copolymer, and the molar ratio of the two monomers can be changed. To adjust the glass transition temperature of the hard segment polymer chain; in particular, the present invention does not require catalysts and catalyst ligands in each step.

Example 3 Preparation of Linear Triblock Thermoplastic Elastomer Copolymer (PS—PI—PS)

(1) Synthesis of PS—Li: Anionic polymerization at room temperature for 12 h, under nitrogen protection, the monomer of (1.30 mL, 11.4 mmol) stored in ampoule was added into the sec-BuLi (0.12 mL, 0.08 mmol) as initiator, anhydrous benzene (100 mL) as solve styrene nt, to obtain the poly(styryl)lithium(PS—Li) solution. 2 mL of PS—Li solution was terminated with methanol, to obtain PS solution for test characterization.

Figure 16:
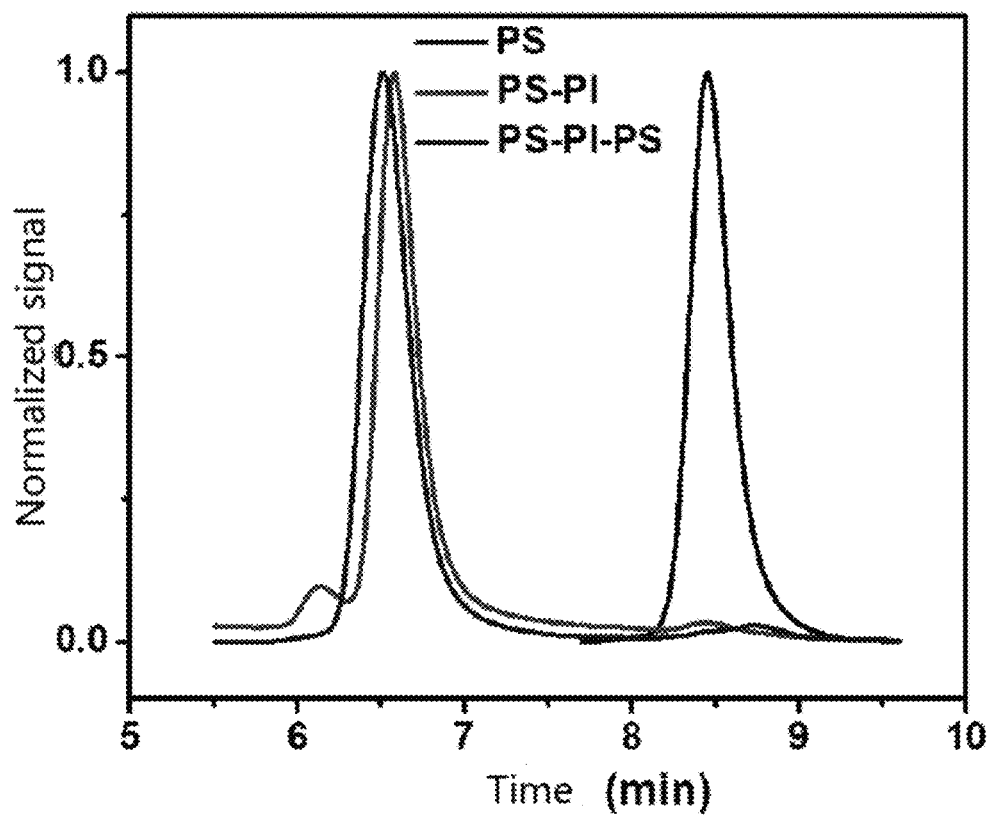
FIG. 16 shows the GPC curves of PS, PS—PI, PS—PI—PS in Example 3, the solvent is THF.

The PS solution in detached ampoule was concentrated by rotary evaporation and precipitated in cold methanol to obtain pure polymers. The solid was collected and dried at 35° C. in a vacuum oven for 24 h to obtain the white solid PS. FIG. 16 shows the GPC of the above PS polymer. From the GPC ($\overline{M}_n$=18 kg·mol$^{-1}$, $\overline{M}_w/\overline{M}_n$=1.06). It can be seen that the peak shape of the PS—PI polymer is symmetrical narrow dispersed.

(2) Synthesis of PS—PI—Li: Anionic polymerization at room temperature for 12 h, under nitrogen protection, isoprene (8.17 g, 120.0 mmol) and anhydrous benzene (200 mL) was added into the PS—Li solution obtained in the above step (1). 2 mL of PS—PI—Li solution was terminated with methanol, to obtain PS—PI solution.

The PS—PI solution in detached ampoule was concentrated by rotary evaporation and precipitated in cold methanol to obtain pure polymers. The solid was collected and dried at 35° C. in a vacuum oven for 24 h to obtain the white solid PS—PI. FIG. 16 shows GPC of PS—PI—Li solution above. From the GPC ($\overline{M}_n$=238.7 kg·mol$^{-1}$, $\overline{M}_w/\overline{M}_n$=1.03). It can be seen that the peak shape of the PS—PI polymer is symmetrical narrow dispersed.

(3) Synthesis of PS—PI—PS:

Anionic polymerization at room temperature for 12 h, under nitrogen protection, mixed isoprene (1.30 ml, 11.4 mmol) and PS—PI—Li solution obtained in step (2) above and the reaction was terminated with anhydrous methanol to obtain PS—PI—PS solution. After the reaction, the reaction solution was concentrated by rotary evaporation and precipitated in cold methanol and dried at 35° C. in a vacuum oven for 24 h to obtain the white solid PS—PI—PS. FIG. 16 shows GPC of PS—PI—PS solution above. From the GPC (n n=248.3 kg·mol$^{-1}$, $\overline{M}_w/\overline{M}_n$=1.06). It can be seen that the peak shape of the PS—PI—PS polymer is symmetrical narrow dispersed.

Figure 17:
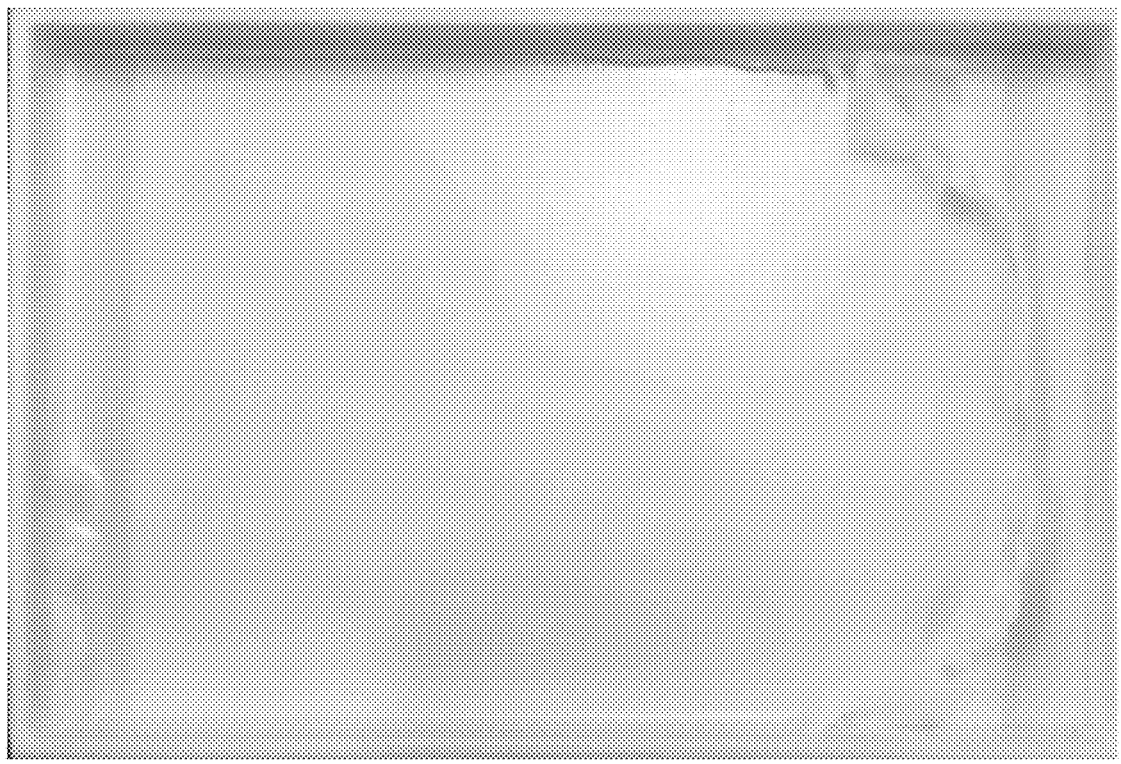
FIG. 17 shows the photo of the PS—PI—PS film formed by solvent volatilization in Example 3.
Figure 18:
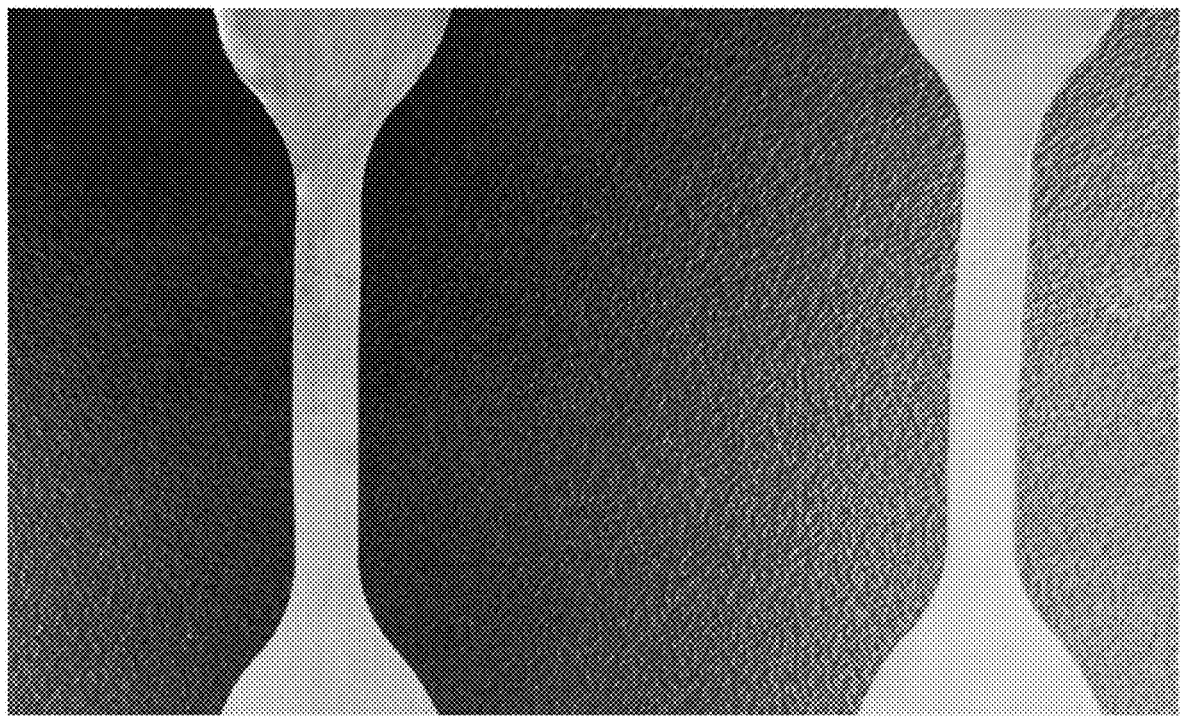
FIG. 18 shows the photo of dumbbell-shaped (PSD-PI)$_8$POSS film formed by solvent volatilization in Example 1.

Dissolve PS—PI—PS in Example 3 and (PS—PI)$_8$ POSS in Example 1 in a beaker with 40 mL of benzene solvent, stirred for 0.5 h to fully dissolve, and cast in a PTFE square tank, covered the tank slowly evaporate the solvent for 3 days, then placed the square tank in a vacuum oven at 35° C. for 12 hours to fully remove the solvent to obtain PS—PI—PS and (PS—PI)$_8$POSS films; FIG. 17 is photo of the actual PS—PI—PS film, which has poor mechanical properties and cannot be made into a dumbbell-shaped sample for mechanical performance testing; FIG. 18 is a photo of the (PS—PI)$_8$POSS film. A dumbbell-shaped sample can be prepared, corresponding to the test shown in FIG. 5. The sample strip used.

The invention claimed is:

1. An eight-arm star-shaped thermoplastic elastomer copolymer, having a structure shown as follow:

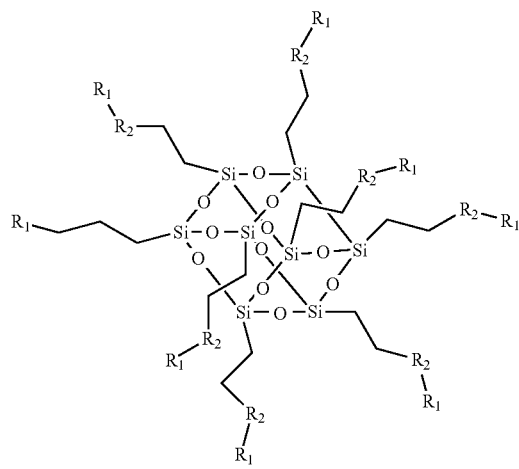

wherein, $R_1$ is

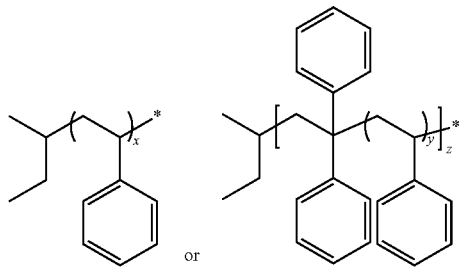

$R_2$ is

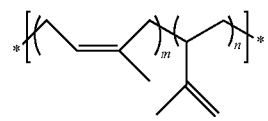

x is from 10 to 200, y is from 2 to 10, z is from 5 to 20, m is from 200 to 600, n is from 10 to 30.

2. A preparation method of preparing the eight-arm star-shaped thermoplastic elastomer copolymer according to claim 1, comprising the following steps:
(1) under nitrogen protection, a lithium compound initiates styrene polymerization to obtain a poly(styryl) lithium(PS—Li);
(2) under nitrogen protection, the poly(styryl)lithium (PS—Li) in step (1) initiates diolefin polymerization to obtain a polystyrene-polydiolefin lithium compound;
(3) under nitrogen protection, an octavinyl polyhedral oligomeric silsesquioxane reacts with the polystyrene-polydiolefin lithium compound of step (2) to obtain an eight-arm star-shaped thermoplastic elastomer copolymer;
or, comprising the following steps:
(4) under nitrogen protection, a lithium compound initiates polymerization of styrene and diphenylethylene to obtain a polystyrene/diphenylethylene lithium compound;

(5) under nitrogen protection, the polystyrene/diphenylethylene lithium compound in step (4) initiates diolefin polymerization to obtain a polystyrene/diphenylethylene-polydiolefin lithium compound;

(6) under nitrogen protection, an octavinyl polyhedral oligomeric silsesquioxane reacts with the polystyrene/diphenylethylene-polydiolefin lithium compound of step (5) to obtain an eight-arm star-shaped thermoplastic elastomer copolymer, wherein the lithium compound is sec-BuLi, the diolefin is isoprene, and the steps (1) to (6) are carried out in the absence of a catalyst.

3. The preparation method according to claim 2, wherein in step (1), the molar ratio of the lithium compound to styrene is from (1:10) to (1:200);

in step (2), the molar ratio of the poly(styryl)lithium(PS—Li) to the diolefin is from (1:210) to (1:630);

in step (3), the molar ratio of the octavinyl polyhedral oligomeric silsesquioxane to the polystyrene-polydiolefin lithium compound is from (1:8.2) to (1:9);

in step (4), the molar ratio of the lithium compound, styrene, and diphenylethylene is 1:(10 to 200):(5 to 20);

in step (5), the molar ratio of the polystyrene/diphenylethylene lithium compound to the diolefin is from (1:210) to (1:630); and in step (6), the molar ratio of the octavinyl polyhedral oligomeric silsesquioxane to the polystyrene/diphenylethylene-polydiolefin lithium compound is from (1:8.2) to (1:9).

4. The preparation method according to claim 2, wherein the polymerization is conducted at room temperature for 6 to 12 hours in step (1), at room temperature for 12 to 24 hours in step (2), at room temperature for 1 to 2 hours in step (3), at room temperature for 12 to 24 hours in step (4), at room temperature for 12 to 24 hours in step (5), and at room temperature for 1 to 2 hours in step (6).

5. The preparation method according to claim 2, wherein the reactions in steps (1) to (6) are carried out in a solvent.

6. The preparation method according to claim 2, wherein in step (3), the reaction is terminated with anhydrous methanol; and in step (6), the reaction is terminated with anhydrous methanol.

* * * * *